United States Patent [19]

Ishibashi et al.

[11] 4,180,392

[45] Dec. 25, 1979

[54] METHOD FOR PRODUCING ORGANIC FERTILIZERS

[75] Inventors: Hiroaki Ishibashi; Shizuo Tanoue, both of Minamatashi; Masakuni Kudo, Kohzushi; Isamu Harada, Iwakunishi, all of Japan

[73] Assignees: Chisso Corporation, Osaka; Sanyo Kokusaku Pulp Co Ltd, Tokyo, both of Japan

[21] Appl. No.: 885,413

[22] Filed: Mar. 10, 1978

[30] Foreign Application Priority Data

Mar. 24, 1977 [JP] Japan .................. 52-32520

[51] Int. Cl.$^2$ .................. C05F 7/00; C05F 11/00
[52] U.S. Cl. .................. 71/25; 71/23; 71/64 F
[58] Field of Search .................. 71/64 F, 11, 25, 27, 71/23

[56] References Cited

U.S. PATENT DOCUMENTS

| 3,274,049 | 9/1966 | Gaschke et al. | 71/25 |
| 3,325,275 | 6/1967 | Bratzler et al. | 71/25 |
| 4,002,457 | 1/1977 | Sears et al. | 71/25 |

FOREIGN PATENT DOCUMENTS 2077876  5/1971  France .................. 71/27

*Primary Examiner*—Joseph Scovronek
*Assistant Examiner*—Chris P. Konkol
*Attorney, Agent, or Firm*—Fred Philpitt

[57] ABSTRACT

Organic fertilizers having a superior fertilizer response (or efficiency), and a higher nitrogen content but a lower water-insoluble type nitrogen content are prepared from spent liquors of sulfite pulp plants according to the method of the present invention. Said method comprises setting the solid matter concentration of said spent liquors in the reaction liquid consisting mainly of said spent liquors to 20–45% by weight and reacting therewith ammonia in an amount of 15–30 mol per 1 Kg of said solid matter, and oxygen or oxygen-containing gas at a reaction temperature of 90°–120° C. under a pressure of 4 Kg/cm$^2$ or higher and lower than 10 Kg/cm$^2$.

3 Claims, 1 Drawing Figure

MINERALIZATION RATIO IN SOIL

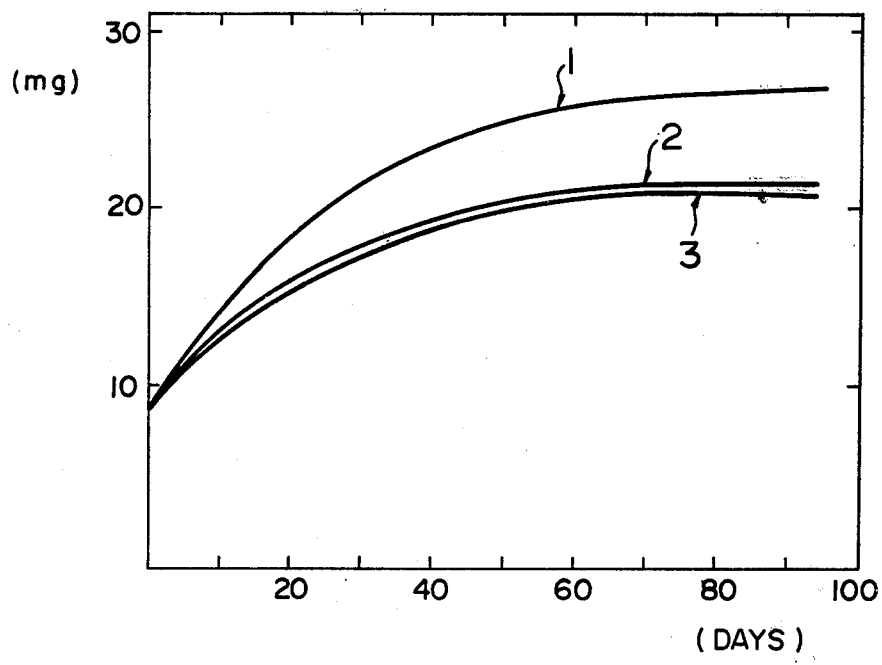

METHOD FOR PRODUCING ORGANIC FERTILIZERS

DESCRIPTION OF THE INVENTION

This invention relates to a method for producing organic fertilizers having a superior fertilizer response or efficiency from a spent liquor of sulfite pulp manufacturing plants.

Recently the reduction of soil power of agricultural land has been pointed out and the use of organic materials has been earnestly recommended. However, the production and use of organic materials such as manure, rice straw or the like show the tendency of reduction due to the requirement of labor. On the other hand, the amount of use of organic fertilizers produced in great amounts in chemical plants shows the tendency of increase. Among these organic fertilizers, there are quite a large variety of products, from waste materials from natural products such as oil cake, fish cake, to treated products of fermented spent liquor, acid decomposition product of fumic acid, synthetic products from aldehyde and urea, etc. Each has both merits and demerits. It is the present status to use them properly depending upon the difference of crops and cultivation method, but there is no satisfactory one, and a more specific fertilizer has been desired.

The pollution of environment by plant spent liquors has become a problem recently. Particularly, the treatment of the spent liquor of pulp plants is a big problem because the spent liquor cannot be disposed as it is under the present regulation of discharged water.

In order to solve these problems, the inventors of the present invention tried to utilize the spent liquor of sulfite pulp plants as fertilizers. One of these attempts is disclosed in the Japanese patent publication No. 36130/1970 but this method necessitates carrying out the reaction under an extremely higher pressure such as a reaction pressure of 10 to 150 $Kg/cm^2$. Further, the formation of water insoluble matters is largely due to the occurrence of resinification reaction and the resulting fertilizers contain a larger amount of nitrogen of the type which cannot be utilized in crops and are inferior in fertilizer response. Thus this method has disadvantageous points as a commercial production method.

We attempted to overcome these drawbacks, and found that by setting the concentration of the spent liquor of sulfite pulp to a definite value and reacting ammonia and oxygen under a lower pressure, they found a commercially advantageous production method which can provide a fertilizer having superior fertilizer response to that of conventional pulp spent liquors.

An object of the present invention is to provide a method which permits the production of organic fertilizers having a higher nitrogen content but a much smaller amount of water-insoluble type nitrogen and having a superior fertilizer response from the spent liquor of sulfite pulp plants.

The method for producing organic fertilizers having a superior fertilizer response from the spent liquor of sulfite pulp plants of the present invention is characterized in that the spent liquor is used as a main raw material, the solid matter concentration of said spent liquor in the reaction liquid is set to 20 to 45% by weight, and ammonia in an amount of 15-30 mol per 1 Kg of said solid matter and oxygen or an oxygen-containing gas are reacted therewith at a reaction temperature of 90°-120° C., under a condition of pressure of 4 $Kg/cm^2$ to 10 $Kg/cm^2$.

The accompanying drawings shows the vicissitude of inorganic type nitrogen in soils and the ordinate shows the content (mg) of inorganic type nitrogen ($NH_3$—N+$NO_3$—N) and the abscissa shows number of days of still standing period and in (1) a fertilizer obtained by the production method of the present invention, i.e. example 1, is used, and in (2) and (3), fertilizers obtained by the production method which is not according to the present invention, i.e. comparative examples 2 and 1, respectively, ae used.

A term "solid matter concentration" referred to herein is a concentration by weight of dry substance in a spent liquor. The regulation of solid matter concentration in the reaction liquid in the production method of the present invention is to treat a spent liquor which is commonly available, in a solid matter concentration of about 10% so as to give a solid matter concentration in the reaction liquid in the range of 20-45% by weight. This treating method can be any of various procedures such as a method in which the water in a spent liquor is evaporated according to a commonly used concentrating method to give a definite concentration, a method in which heat treatment e.g. holding a spent liquor at a higher temperature for a definite time to give a definite solid matter concentration, a method in which air is blow into a spent liquor on heating, a method in which water is driven off under a reduced pressure and the like.

The addition of ammonia in the method of the present invention is carried out according to various processes such as the direct addition of aqueous ammonia or the direct blowing of ammonia gas to a spent liquor, etc. but is not limited particularly to any of them. The amount of addition is preferably in the range of 15-30 mol per 1 Kg of solid matter of a spent liquor of sulfite pulp. The introduction of oxygen or an oxygen-containing gas under a pressure is carried out by charging from a pressurized bomb or a compressor. Any method can be used so long as the introduction under a pressure can be made by maintaining a definite pressure through control with a reducing valve or the like.

The technical matters of the production method of the present invention will be described more fully hereinafter. The principal raw material used in the method of the present invention is a spent liquor of a pulp plant. A spent liquor of sulfite pulp containing a large amount of lignin is preferable. Said spent liquor is not limited by type of digestion, kind of sulfite salt used in digestion, kind of wood of pulp raw material, etc. The concentration of the solid matter of a spent liquor in the reaction liquid is preferably in the range of 20-45% by weight. If it is more than 45% by weight, the viscosity of reaction liquid becomes higher, smooth agitation becomes difficult, percentage of reaction, i.e. percentage of bonding of ammonia is lowered, and only a product of lower total nitrogen is obtained with a bad yield. On the contrary if the concentration is less than 20%, there is a drawback in that a large amount of water must be driven off, hence loss of energy is larger and the yield of organic fertilizers per a definite reactor is reduced.

The amount of ammonia used in the method of the present invention is suitably in the range of 15–30 mol per 1 Kg of solid matter of a spent liquor. If the concentration of ammonia is too much lower than this range, only fertilizers having a lower total nitrogen can be obtained and this is not preferable as an organic type fertilizer. On the contrary, if the concentration of ammonia is much higher, percentage reaction rises, the total nitrogen content in a product relative to ammonia concentration becomes higher and increases to a certain extent but the rate of increase is lowered if the concentration becomes higher than 30 mol. On this account, percentage reaction of ammonia is lowered, resulting in only the increase of excessive ammonia in turn, troublesome recovery thereof and loss of ammonia. Further, in case of higher concentration and higher reaction temperature, a partial pressure of ammonia alone rises to more than 10 Kg/cm$^2$ and the reaction of the present invention becomes infeasible and such superior fertilizers as above-mentioned cannot be obtained. The amount of added ammonia bonded or fixed with the lignin in a spent liquor has a linearly proportional relationship with the amount of oxygen. Thus the mol ratio of oxygen and ammonia in the present invention is not particularly limited but ammonia/oxygen is preferably 0.8 (mol ratio) or higher.

The pressure at reaction in the production method of the present invention is in the range of 4 Kg/cm$^2$ (inclusive) to 10 Kg/cm$^2$. If production is made under a pressure of 10 Kg/cm$^2$ or higher which is outside the range of the present invention, resulting fertilizers contain a large amount of water-insoluble type nitrogen and show poor mineralization percentage in soil, thus a product having a preferable type from the standpoint of fertilizer response cannot be obtained. Further, crops obtained by using these fertilizers are lighter in weight in general, and ratio of yield of fermentation products is considerably larger and thus they are much inferior to the fertilizers obtained according to the production method of the present invention. On the other hand, if the pressure at reaction is less than 4 Kg/cm$^2$, bond of ammonia becomes less, resulting in increased loss of ammonia, poor yield and reduction of total nitrogen content of the resulting fertilizers which is not preferable for organic type fertilizers.

With regard to reaction temperature, a temperature of 90° C.–120° C. is preferable. It is it lower than 90° C., reaction rate becomes much slower, reactivity of ammonia becomes poorer, reaction time necessary for obtaining a fertilizer having a definite total nitrogen content becomes much longer. This means no practical value as a commercial production method. If it is higher than 120° C., resulting organic type fertilizers increase the content of water-insoluble matter as well as materials of nitrogen type which is difficult to be decomposed. This is not preferable in the point of fertilizer response. Moreover, the fertilizers obtained according to a higher temperature reaction, often give a harmful effect to crops. This is believed to be caused by a substance harmful to crops, formed due to a higher temperature.

The feature of the present invention is in the point, first of all, that fertilizers having a superior fertilizer response can be obtained by a reaction carried out under a pressure lower than that of conventional method and the construction cost and operation cost of a reaction apparatus are more economical and also safer because of lower pressure. In the second place, fertilizers obtained according to a production method of the present invention show less tendency of resinification and less formation of water insoluble materials. On this account, products contain less nitrogen of the type which is difficult to be decomposed i.e. so-called ineffective type nitrogen, and show superior slow-releasing property. It is to be mentioned that there is a very preferable tendency of resembling natural organic oil cake rather than organic type of fertilizers produced under a higher pressure, by the change of not only the form of nitrogen but also of carbon i.e. humus. Thirdly, the fertilizers obtained by the production method of the present invention have advantages in that crops produced by way of the fertilizers are very good in the yield, and very low in the percentages of fermentation occurrence, generation of bitter taste, etc.

The features of the present invention will be more fully described by referring to following examples and comparative examples.

EXAMPLE 1

Two thousands g of a spent liquor of sulfite pulp (concentration of solid matter: 10%) was subjected to concentration treatment under a reduced pressure of about 20 mm Hg at 90° C. to 800 g and regulated to a solid matter concentration of 25%. Resulting product in an amount of 600 g was introduced in a pressure-resisting reaction vessel (having an inner volume of 2 l, equipped with a stirrer) to which 63.8 g (25 mol per 1 Kg solid matter) of ammonia gas was blown and sealed. After this vessel was heated up to 100° C., oxygen gas from a bomb was introduced under pressure up to 8.0 Kg/cm$^2$. When stirring was initiated, the temperature of reaction liquid became 110° C. and this state was maintained. During the reaction, the stirring (900 rpm) and introducing of oxygen under pressure were continued and a reaction pressure of 8.0 Kg/cm$^2$ was maintained. After reaction for 4 hours, the reaction liquid was cooled, the pressure was released, and the reaction liquid was taken out. The resulting liquid was concentrated to dryness by a spray drier to prepare a fertilizer. resultant fertilizer was dark brown powder and subjected to the following testings. The items of testing and results are yield (Table 1), efficiency (Table 1), total nitrogen component (hereinafter referred to as T—N, Table 1), ammonia type nitrogen (hereinafter referred to as NH$_3$—N, Table 1), water solubility of nitrogen component (Table 1), analyses of total carbon and humus, etc. (Table 2), germination state (Table 3), fertilizer response test (Table 4), test of quality of crops (Table 5) and mineralization ratio in soil (FIGURE). In the following examples and comparative examples, similar expressions were made.

Testing methods of fertilizers are as follows:

Analysis of total carbon, humus, etc. (Table 2)

Analyses of total carbon, humus, humic acid and fulvic acid were carried out. Total nitrogen was tested by a CN-corder, humus acid and pulvic acid were tested by a titration method by way of Tiurin potassium permanganate.

Germination Test (Table 3)

Into a schale having a diameter of about 12 cm, 20 pieces of seed of Komatsuna (a kind of Chinese cabbage), 20 ml each of samples in a definite concentration was added and left to stand at room temperature (15°–20° C.) and germination states after 8 days were investigated.

Fertilizer response test (Table 4)

By using actual fields, fertilizer responses were investigated under following conditions:

Crops to be tested—lettuce; soil used in test—soil of black volcanic ash; size of testing plot—2.5 m × 5 m = 12.5 m²; (3 replicates) seeding—Sept. 7; fertilization—Sept. 15; fixed plantation—Sept. 26; harvesting—Dec. 6; density of plantation—width of furrow, 125 cm; distance of mutual stem—30 cm; paralleled plantation; and amount of fertilization—N, $P_2O_5$, $K_2O$ are all 10 Kg/10 a and deficient portion was supplemented by calcium perphosphate and potassium sulfate.

Test of crop quality (Table 5)

Tests for yield and quality were carried out by using prince melon.

Kind of samples to be tested—FE prince; seeding—Mar. 10; digging up of pot—Apr. 22 in a plastic pot of 12 cmφ; pick up of bud—Apr. 30; fixed planting—May 2; harvest—July 7; fertilization amount—N, $P_2O_5$ and $K_2O$ were all 12 Kg/10 a; fruit culture by controlled branching—culture using one side runner; child vines—2; pick up of bud—20 knots; fruit culture—6 to 15 knots; one child vine bore 3 fruits; density of plantation—200 m × 75 cm.

Mineralization ratio in soil (FIGURE)

To 100 gr of alluvial soil, samples in an amount of 30 mg as nitrogen per dry soil were added, water corresponding to 60% of maximum dissolution amount of water was added and left to standing and kept at 30° C. by insulation. After a definite period of time, the soil was extracted with 10% potassium chloride and inorganic form of nitrogen ($NH_3$—N+$NO_3$N)was analyzed by Cornway's micro-diffusion method.

COMPARATIVE EXAMPLE 1

A fertilizer was prepared according to a method same with that of example 1 except that reaction temperature was 130° C. and reaction pressure was 30 Kg/cm².

As shown in Tables 1-5 and FIGURE, resultant fertilizercontained a large amount of water-insoluble type nitrogen and showed a poor percentage of mineralization in soil and germination hindrance. Further, the crops obtained by using this fertilizer was smaller in weight, showed very large percentages of fermentation occurrence and bitter taste generation and thus was extremely worse than those obtained by the fertilizer of example 1.

EXAMPLES 2-4

Fertilizers were prepared according to a method same with that of example 1 except that the amount of ammonia added was 51 g (20 mol per 1 Kg of solid mater in a spent liquor) and reaction pressures were set to 4.0, 6.0 and 8.0 Kg/cm², respectively.

As shown in Tables 1-3, resultant fertilizer did not contain insoluble type nitrogen almost at all, showed little germination hindrance and was superior in fertilizer response as that of example 1.

COMPARATIVE EXAMPLE 2

A preparation was carried out according to a method same with those of examples 2-4 except that reaction pressure was set to 30 Kg/cm².

As shown in Tables 1-3 and FIGURE, resultant fertilizer contained a large amount of water-insoluble nitrogen, showed poorer percentage of mineralization in soil and also germination hindrance in case of a large fertilization amount. This is the same with that in comparative example 1.

COMPARATIVE EXAMPLE 3

A fertilizer was prepared according to a method same with those of examples 2-4 except that reaction pressure was set to 15 Kg/cm².

As shown in Tables 1 and 4, resultant fertilizer contained a large amount of water-insoluble type nitrogen. The weights of the crops obtained by using this fertilizer were light. This fertilizer was extremely worse than the fertilizers obtained according to examples 2-4.

COMPARATIVE EXAMPLE 4

A fertilizer was prepared according to a method same with those of examples 2-4 except that a reaction pressure was set to 11 Kg/cm².

As shown in Tables 1 and 3, resultant fertilizer contained a large amount of water-insoluble type nitrogen, showed germination hindrance and was extremely worse than those of examples 2-4.

COMPARATIVE EXAMPLES 5-6

Fertilizers were prepared according to a method same with those of examples 2-4 except that reaction pressures were set to 3.0 and 3.5 Kg/cm², respectively.

As shown in Table 1, this production method provides very poor yields, and products having no practical values as an organic type fertilizer because of lower T-N values.

EXAMPLES 5, 6

Fertilizers were prepared according to a method same with that of example 1 except that reaction temperatures were 90° C. and 120° C., respectively.

As shown in Table 1, resultant fertilizer contained only a small amount of water-insoluble type nitrogen and is superior similarly to the fertilizer of example 1.

COMPARATIVE EXAMPLES 7 and 8

Fertilizers were prepared according to methods same with those of examples 1, 5 and 6 except that reaction temperatures were set to 130° C. and 140° C., respectively.

As shown in Tables 1 and 3, resultant fertilizers contained large amounts of water-insoluble type nitrogen, showed germination hindrance and were extremely worse than fertilizers obtained in example 1.

COMPARATIVE EXAMPLES 9 and 10

Fertilizers were prepared according to a method same with that of example 1 except that reaction temperatures were set to 70° C. and 80° C., respectively. As shown in Table 1, this production method is extremely worse in yield, and resultant fertilizer has no practical value due to lower T-N.

EXAMPLES 7 and 8

Three thousands g of a spent liquor was treated according to a method same with that of example 1 and the concentration of solid matter were controlled to 30% and 40%, respectively. Fertilizers were prepared according to a method same with that of example 4.

As shown in Table 1, resultant fertilizers were obtained with good yield, contained only a small amount of water-insoluble type nitrogen and were superior as in other examples.

COMPARATIVE EXAMPLE 11

Spent liquors were treated by methods similar to those of examples 7 and 8 and a concentration of solid matter was adjusted to 50%. In other points by using similar methods as in examples 4, 7 and 8, fertilizers were prepared.

This production method was not operated so smoothly because the viscosity of reaction liquid increased and a stirrer stopped frequently. Further the yields of fertilizers were extremely worse and the value of T-N was lower as shown in Table 1 and could not be regarded as a practical method.

COMPARATIVE EXAMPLE 12

A fertilizer was prepared according to a method same with that of example 1 except that a spent liquor was used as it was without being treated.

According to this production method, the resulting reaction liquid taken out could not be dried in a spray drier as in example 1 and required a great deal of time and hand before obtaining fertilizer, and yield was also so extremely worse as being 6.9 g and was a method which had no practical value.

EXAMPLES 9 and 10

Fertilizers were prepared according to methods same with those of examples 1 and 4 except that the amounts of addition of ammonia were set to 15 mol and 30 mol per 1 Kg of solid matter in a spent liquor.

The fertilizers obtained according to this method were, as shown in Table 1, same with those of other examples.

COMPARATIVE EXAMPLES 13–14

Preparations were carried out according to the same methods as those of Examples 1, 4, 9 and 10 except that the amounts of addition of ammonia were set to 5 mol and 10 mol per 1 Kg of the solid matter in spent liquors.

As shown in Table 1, this production method provides extremely poor yield, and resultant fertilizers had no practical value because of lower T-N.

COMPARATIVE EXAMPLES 15

Preparation was carried out according to the same methods as those of examples 1, 4, 9 and 10 except that the amount of addition of ammonia was set to 40 mol per 1 Kg of the solid matter in a spent liquor. This method provides a large amount of ammonia at the time of concentration to dryness the recovery of which was very troublesome. Further even when the concentration of ammonia was higher, yield and T-N did not increase as shown in Table 1 and thus this was an impractical method.

REFERENTIAL EXAMPLES

Tests same with those of examples were carried out with regard to oil cake, ammonium sulfate, urea and no fertilizer. The results are shown in Tables 2–5.

Table 1

| | | | Nitrogen portion (%) | | | | | |
|---|---|---|---|---|---|---|---|---|
| | Yield (g) | Efficiency (%) | T—N | $NH_3$—N | Cold water | | Hot water | |
| | | | | | Soluble | insoluble | soluble | insoluble |
| Examples | | | | | | | | |
| 1 | 171 | 119 | 19.1 | 6.9 | 18.9 | 0.3 | 19.1 | 0.0 |
| 2 | 176 | 117 | 17.4 | 6.4 | 17.1 | 0.3 | 17.4 | 0.0 |
| 3 | 179 | 119 | 17.6 | 6.3 | 17.3 | 0.3 | 17.6 | 0.0 |
| 4 | 180 | 120 | 18.2 | 6.3 | 17.8 | 0.4 | 18.1 | 0.1 |
| 5 | 176 | 117 | 17.5 | 7.0 | 17.3 | 0.2 | 17.5 | 0.0 |
| 6 | 180 | 120 | 18.8 | 6.7 | 18.2 | 0.6 | 18.6 | 0.2 |
| 7 | 210 | 117 | 18.1 | 6.5 | 17.8 | 0.3 | 18.0 | 0.1 |
| 8 | 269 | 112 | 16.7 | 5.7 | 16.2 | 0.5 | 16.5 | 0.2 |
| 9 | 174 | 116 | 18.0 | 6.1 | 17.7 | 0.3 | 17.9 | 0.1 |
| 10 | 181 | 121 | 18.8 | 6.4 | 18.4 | 0.4 | 18.6 | 0.2 |
| Comparative examples | | | | | | | | |
| 1 | 177 | 118 | 19.8 | 6.0 | 15.1 | 4.7 | 17.3 | 2.5 |
| 2 | 174 | 116 | 17.5 | 6.3 | 13.2 | 4.3 | 16.5 | 1.0 |
| 3 | 177 | 118 | 18.1 | 6.4 | 14.2 | 3.9 | 18.4 | 0.7 |
| 4 | 182 | 121 | 18.5 | 6.8 | 15.2 | 3.3 | 17.9 | 0.6 |
| 5 | 143 | 95 9.3 | 4.5 | — | — | — | — | |
| 6 | 152 | 101 | 11.1 | 4.5 | — | — | — | — |
| 7 | 177 | 118 | 18.2 | 6.5 | 14.3 | 3.9 | 16.2 | 2.0 |
| 8 | 173 | 115 | 18.5 | 6.6 | 14.7 | 3.8 | 17.7 | 0.8 |
| 9 | 137 | 91 | 9.8 | 4.1 | — | — | — | — |
| 10 | 148 | 99 | 12.6 | 5.1 | — | — | — | — |
| 11 | 291 | 97 | 10.4 | 4.7 | — | — | — | — |
| 12 | 69 | 115 | 17.9 | 6.3 | 17.6 | 0.3 | 17.8 | 0.1 |
| 13 | 133 | 89 | 7.1 | 4.2 | — | — | — | — |
| 14 | 147 | 98 | 11.3 | 5.6 | — | — | — | — |
| 15 | 144 | 96 | 12.4 | 6.3 | — | — | — | — |

Table 2

| production method | fertilizer | | | |
|---|---|---|---|---|
| | Total carbon (%) | humus[*2] (ml) | humic acid[*2] (ml) | fulvic acid[*2] (ml) |
| Example 1 | 35.3 | 605 | 302 | 303 |
| Comparative example | 34.9 | 710 | 398 | 278 |
| oil cake | 41.3 | 519 | 179 | 330 |

[*2]Consumption (ml) of 0.1 N potassium permanganate per 1.0 g of fertilizer

Table 3

| Production method | Fertilizer Concentration (ppm) | Number of germination of plant* | Number of developed plant** | Green weight of developed plant* (g) |
|---|---|---|---|---|
| Example 1 | 100 | 20.0 | 19.5 | 1.86 |
|  | 300 | 20.0 | 19.0 | 1.80 |
|  | 500 | 20.0 | 18.5 | 1.75 |
|  | 750 | 15.0 | 13.4 | 1.31 |
|  | 1000 | 14.0 | 11.2 | 1.27 |
| Example 2 | 100 | 20.0 | 19.7 | 1.88 |
|  | 300 | 20.0 | 19.7 | 1.90 |
|  | 500 | 20.0 | 19.3 | 1.81 |
|  | 750 | 14.7 | 13.0 | 1.30 |
|  | 1000 | 13.3 | 12.0 | 1.22 |
| Example 4 | 100 | 20.0 | 19.7 | 1.88 |
|  | 300 | 20.0 | 19.7 | 1.83 |
|  | 500 | 19.7 | 18.3 | 1.73 |
|  | 750 | 15.3 | 12.7 | 1.30 |
|  | 1000 | 14.3 | 11.3 | 1.18 |
| Comparative example 1 | 100 | 19.0 | 18.8 | 1.82 |
|  | 300 | 18.0 | 13.4 | 1.30 |
|  | 500 | 13.0 | 3.0 | 0.30 |
|  | 750 | 3.0 | 0.5 | 0.0 |
|  | 1000 | 2.5 | 0.0 | 0.0 |
| Comparative example 2 | 100 | 20.0 | 19.7 | 1.85 |
|  | 300 | 20.0 | 15.0 | 1.48 |
|  | 500 | 16.0 | 4.7 | 0.45 |
|  | 750 | 3.7 | 0.7 | 0.0 |
|  | 1000 | 3.0 | 0.0 | 0.0 |
| Comparative example 4 | 100 | 20.0 | 19.3 | 1.86 |
|  | 300 | 20.0 | 13.7 | 1.37 |
|  | 500 | 15.3 | 5.3 | 0.52 |
|  | 750 | 7.3 | 0.7 | 0.2 |
|  | 1000 | 3.7 | 0.0 | 0.0 |
| Comparative example 8 | 100 | 20.0 | 19.2 | 1.83 |
|  | 300 | 20.0 | 14.0 | 1.35 |
|  | 500 | 14.0 | 4.1 | 0.41 |
|  | 750 | 3.1 | 0.5 | 0.0 |
|  | 000 | 2.7 | 0.0 | 0.0 |
| water alone | *** | 20.0 | 19.3 | 1.83 |

*a mean value of 3 replicates
**those longer than 15 mm
***control test (blank)

Table 4

| Test section | | Yield (Kg/20 plants) | | per one plants | | |
|---|---|---|---|---|---|---|
| | | Total weight | Ball weight | ball weight (g) | ball diameter (cm) | Bulb height (cm) |
| Example 1 | | 20.62 | 12.96 | 634 | 12.9 | 13.8 |
| Comparative example 1 | | 16.87 | 9.87 | 505 | 12.1 | 13.0 |
| Comparative example 3 | | 17.10 | 10.31 | 518 | 12.3 | 13.1 |
| Referential example | Ammonium sulfate | 16.70 | 9.51 | 485 | 12.0 | 12.5 |
|  | Oil cake | 17.18 | 10.80 | 530 | 12.2 | 12.6 |
|  | No fertilizer | 12.82 | 7.37 | 370 | 10.7 | 11.0 |

Table 5

| | | Investigation of fruit properties | | | | |
|---|---|---|---|---|---|---|
| | | Mean weight of one fruit (g) | Fragrance (point)* | Degree of sugar (Brix degree)** | Fiber (point)* | Ratio of yield of fermentation product (%) | Ratio of yield of bitter substances (%) |
| Example 1 | | 530 | 2.1 | 12.6 | 1.0 | 4 | 6 |
| Comparative example 1 | | 518 | 1.9 | 12.2 | 1.1 | 15 | 18 |
| Referen- | Urea | 501 | 1.7 | 11.6 | 1.0 | 35 | 34 |

Table 5-continued

| | | Mean weight of one fruit (g) | Investigation of fruit properties | | | | |
| --- | --- | --- | --- | --- | --- | --- | --- |
| | | | Fragrance (point)* | Degree of sugar (Brix degree)** | Fiber (point)* | Ratio of yield of fermentation product (%) | Ratio of yield of bitter substances (%) |
| tial example | Oil cake | 510 | 1.8 | 12.0 | 1.0 | 20 | 37 |

*response test
**by way of Brix Saccharimeter

What is claimed is:

1. A method of producing organic-type fertilizer from the spent liquors of sulfite pulp, which method comprises:
   (a) adjusting the solid matter concentration of said spent liquors to 20–45% by weight,
   (b) reacting said spent liquor with
      (1) 15–31 mols of ammonia per 1 Kg of said solid matter, and
      (2) oxygen or an oxygen-containing gas
   (c) carrying out the reaction of step (b) at a temperature of 90°–120° C. and under a pressure of greater than or equal to 4 Kg/cm² but less than 10 Kg/cm².

2. The method of claim 1 wherein the ammonia is in the form of ammonia gas.

3. The method according to claim 1 wherein the mole ratio of ammonia/oxygen is at least 0.8.

* * * * *